Nov. 29, 1966  E. R. PETERSON  3,288,421
MOVABLE AND ROTATABLE TOP
Filed March 29, 1965  3 Sheets-Sheet 1

INVENTOR
EVERETT R. PETERSON

BY [signature]
ATTORNEY

Nov. 29, 1966  E. R. PETERSON  3,288,421
MOVABLE AND ROTATABLE TOP
Filed March 29, 1965  3 Sheets-Sheet 2

INVENTOR
EVERETT R. PETERSON

BY Wm T. Metz

ATTORNEY

Nov. 29, 1966  E. R. PETERSON  3,288,421
MOVABLE AND ROTATABLE TOP

Filed March 29, 1965  3 Sheets-Sheet 3

INVENTOR
EVERETT R. PETERSON

BY *Wm T. Mef*
ATTORNEY

United States Patent Office 3,288,421
Patented Nov. 29, 1966

3,288,421
MOVABLE AND ROTATABLE TOP
Everett R. Peterson, Rte. 1, Biggsville, Ill.
Filed Mar. 29, 1965, Ser. No. 443,536
4 Claims. (Cl. 248—396)

This invention pertains to a means for adjusting one planar surface in relation to another and is shown in a practical application by way of a movable and rotatable top.

Heretofore the art of adjusting one surface in relation to another has used straight adjusting means having no interconnection with each other. This has made it impossible to adjust one planar surface in relation to the other giving simultaneous retraction, extension, lateral, rotatable and tilting movements.

It is therefore an object of this invention to provide a means for adjusting one planar surface in relation to another providing simultaneous retraction, extension, lateral, rotatable and tilting movements.

It is a further object of this invention to provide a means for actuating the mechanism of adjusting one planar surface in relation to another.

Figure 1:
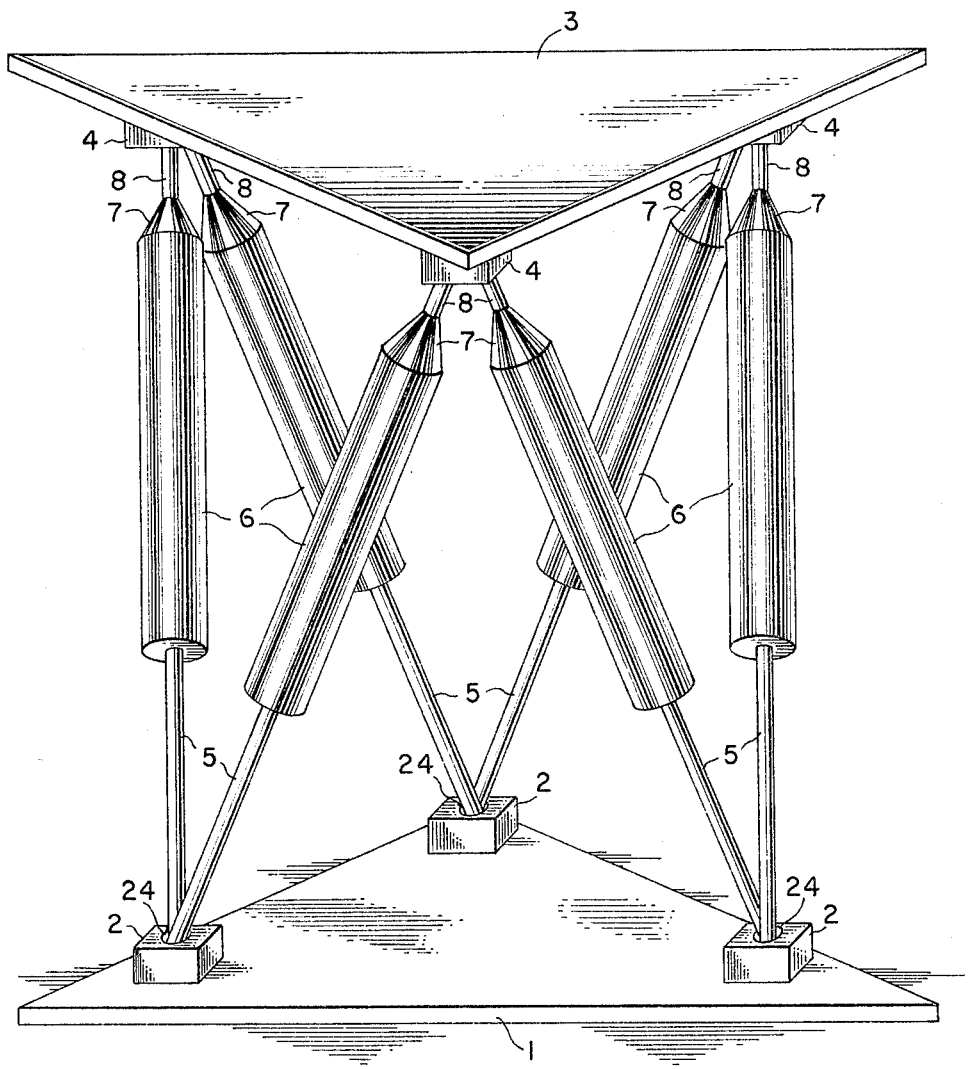
Figures 2, 3:
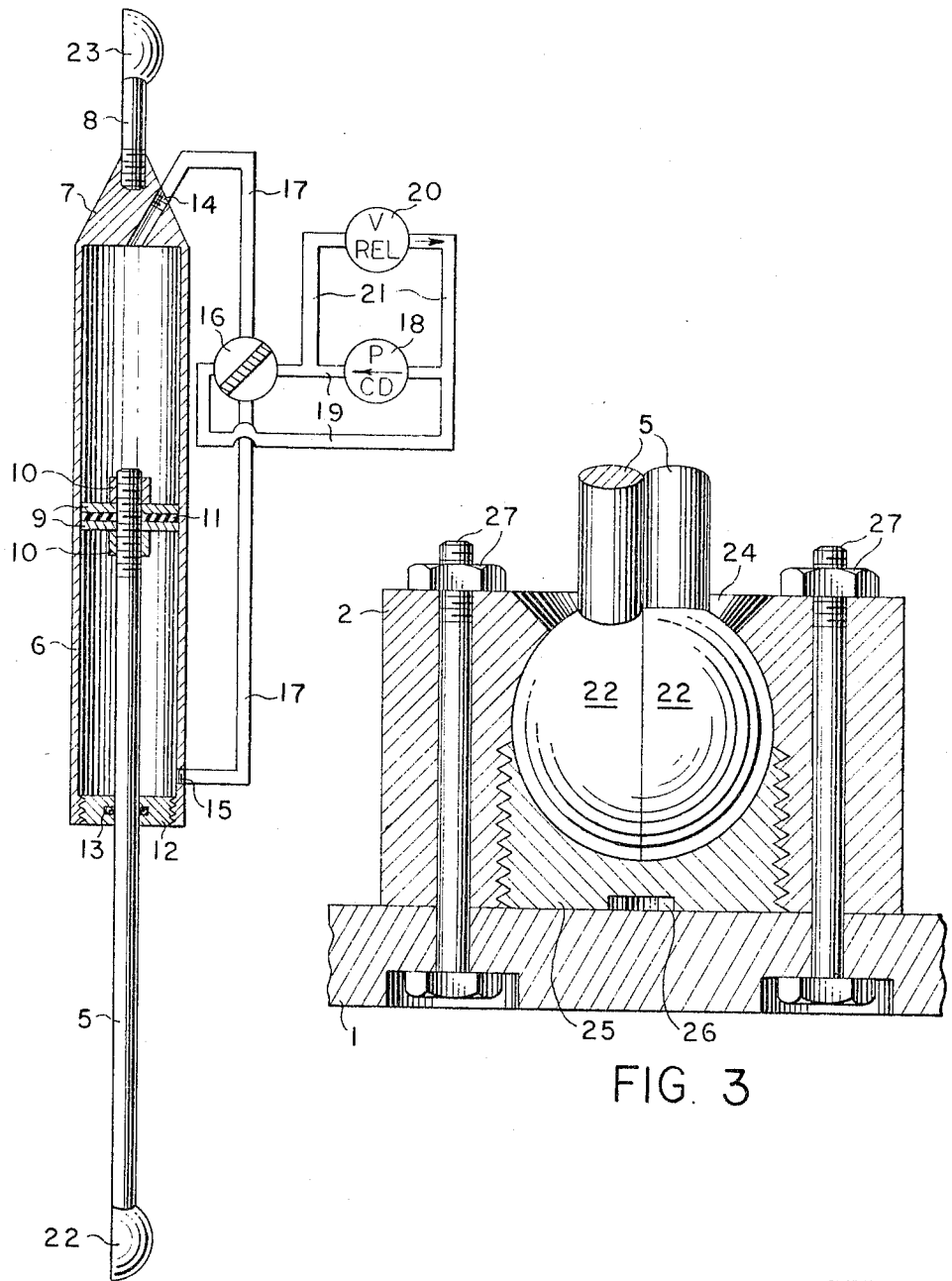
Figure 4:
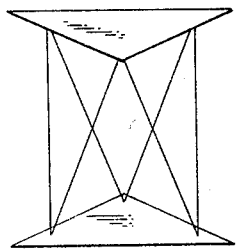
Figure 5:
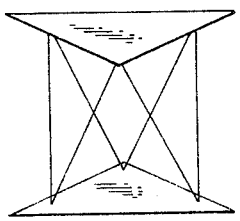
Figure 6:
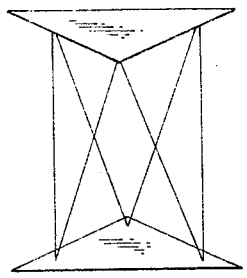
Figure 7:
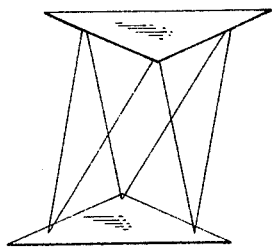
Figure 8:
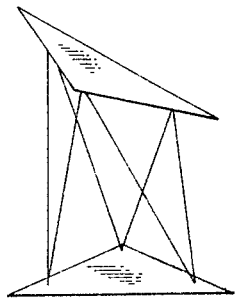
Figure 9:
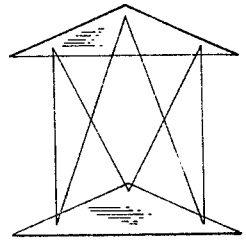
Figure 10:
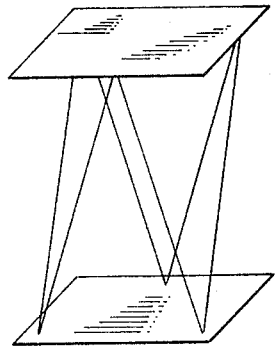
Figure 11:
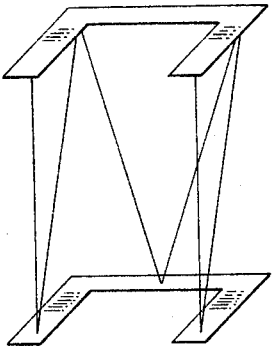

Further objects and advantages of this invention will become apparent from the following drawings, descriptions and claims:

In the drawings FIG. 1 is a pictorial representation of the mechanism for adjusting one planar surface in relation to another. FIG. 2 is a sectional view of the hydraulic cylinders and rods used in each connection. FIG. 3 is a sectional view of the means for connecting the rods to the planar surface. FIGS. 4 through 9 are schematic drawings of FIG. 1 showing some of the positions to which the top surface may be adjusted, FIG. 10 shows the top and base in a rectangular configuration. FIG. 11 shows the top and base in a rectangular configuration with the centers removed and one connection in the top surface split.

The base 1 has located thereon three footings 2 and the top 3 has located thereon 3 footings 4. Each footing 2 has two rods 5 extending therefrom into hydraulic cylinders 6. Each hydraulic cylinder 6 has a cap 7 at its upper end into which is screwed an upper rod 8. Each hydraulic cylinder 6 has located therein a split piston 9. Each split piston 9 is fastened onto one end of a rod 5 by nuts 10 screwed onto the rod 5. A seal 11 is thus held between the split piston 9. Packing gland 12 is screwed into the bottom of the hydraulic cylinder 6 and holds seal 13. Port 14 in the cap 7 and port 15 near the bottom of the hydraulic cylinder 6 are connected to a two-way valve 16 by tubing 17. The two-way valve 16 is connected to a constant delivery pump 18 by tubing 19. Pressure relief valve 20 is connected across the constant delivery pump 18 by the tubing 21. The lower end of each rod 5 has as a part thereof a split ball 22, and the upper end of each rod 8 has as a part thereof a similar split ball 23. FIG. 3 is a sectional view of one of the footings 2 and the split balls 22. The sectional view of the footings 4 and the split balls 23 would be identical to FIG. 3. The footing 2 has an opening 24 therein which allows the rods 5 to move to a certain angle. After the rods 5 are placed through the opening 24, they are held in a movable position by the retainer 25. The retainer 25 is screwed into the footing 2 by placing a wrench in the socket 26 in the retainer 25. The footings 2 are then bolted to the base 1 by the nuts and bolts 27.

Each one of the hydraulic cylinders 6 may be connected through a two-way valve 16 to a separate constant delivery pump 18 or one or more constant delivery pumps may be used as needed. Each hydraulic cylinder 6 has a separate two-way valve 16 so that each hydraulic cylinder 6 may be operated separately from the other hydraulic cylinders. The two-way valves 16 may be operated in relation to each other or independently as desired.

As the two-way valve 16 is in the position shown in FIG. 2 the rod 5 will retract into the cylinder 6. If the two-way valve 16 is turned ninety degrees, the rod 5 will move out of the cylinder 6. Stationary position will be obtained when the two-way valve 16 is shut off by turning it to either a horizontal or vertical position.

The centers of the balls formed by the two split balls 22 in each footing 2 form an imaginary plane which is parallel to the base 1, and the centers of the balls formed by the two split balls 23 in each footing 4 form an imaginary plane which is parallel to the top planar surface 3. As the pistons 9 are made to move in the hydraulic cylinders 6 the top planar surface 3 is made to move to various positions. Some of these positions are illustrated by the schematic drawings in FIGS. 4 through 9. These figures illustrate some of the basic movements such as retraction, extension, lateral, rotating, and tilting movements. Within the limits of the dimensions of the hydraulic cylinders 6 and the rods 5 any number of positions for the top planar surface 3 may be obtained.

FIG. 10 illustrates that the base 1 and the top 3 may be of a different shape so long as there are only three footings on each surface. With three footings as explained above an imaginary plane is formed parallel to the surfaces. However, it may be desired to open the front of the surfaces as shown in FIG. 11, and in this case the front footing 4 in the top planar surface may be split into two ball and socket footings. With this three to four point relationship the top planar surface 3 can still be made to move in relation to the bottom planar surface 1 without having to synchronize the movements of each hydraulic cylinder 6 and rod 5. If more than four points are used in the top planar surface, however, one of the cylinders and rods alone cannot be extended.

In the machine shown in FIG. 1 each one of the cylinders 6 may be operated separately or in relation with the other cylinders 6. Also each supporting unit comprised of a rod 5, cylinder 6 and an upper rod 8 is essential to the support of the machine. If one supporting unit is removed the machine will collapse.

The rods 5 are rotatable in the hydraulic cylinders 6, and the split balls 22 and 23 are movable in the footings 2 and 4. This allows complete freedom of rotation and movement of each one of the supporting units.

The two-way valves 16 can be synchronized so that the turning of several valves in proportion will attain certain predetermined positions. The pressure relief valve 20 is used so that when a two-way valve 16 completely shuts off the flow from the constant delivery pump 18 to the hydraulic cylinder 6 the pressure relief valve 21 will allow the constant delivery pump 18 to continue operating.

This machine thus has advantages over the simple leveling table with columns and ways in that we have here six identical supporting units and footings which can be mass produced and are simple in construction. The invention need not, however, use only hydraulic cylinders and rods to extend the supporting units. Any other form of mechanism may be used which will extend and retract such as screw jacks, which would of course be much more cumbersome.

I claim:
1. An adjusting machine comprised of
   two planar surfaces,
   three footings connected to one of the planar surfaces,
   three footings connected to the second planar surface,
   six extendable supporting units,
   two of the extendable supporting units connected from each footing in one planar surface to separate footings in the second planar surface.

2. An adjusting machine comprised of
two planar surfaces,
three footings connected to one of the planar surfaces,
three footings connected to the second planar surface,
the footings each having a socket therein to receive a ball,
six extendable supporting units having a split ball at each end thereof,
two of the extendable supporting units connected from each footing in one planar surface to separate footings in the second planar surface.

3. An adjusting machine comprised of
two planar surfaces,
three footings connected to one of the planar surfaces,
three footings connected to the second planar surface,
the footings each having a socket therein to receive a ball,
six supporting units each comprised of a hydraulic cylinder having a rod fixed to one end and an extendable rod in its other end,
a split ball at the end of each rod,
two of the supporting units connected from each footing in one planar surface to separate footings in the second planar surface,
the split balls at the end of the two rods connected to one footing being held together so as to essentially form a ball.

4. An adjusting machine comprised of two planar surfaces, three footings connected to the first planar surface, four footings connected to the second planar surface, six extendable supporting units, two of the extendable supporting units connected to each footing in the first planar surface, two of the extendable supporting units which are not connected to the same footing in the first planar surface connected to each of two footings in the second planar surface, and one of the extendable supporting units connected to each of the other footings in the second planar surface.

References Cited by the Examiner
UNITED STATES PATENTS

| | | | |
|---|---|---|---|
| 2,995,331 | 8/1961 | Stanton | 248—163 |
| 3,215,391 | 11/1965 | Storm | 248—396 |
| 3,229,941 | 1/1966 | Suliteanu | 248—163 |

CLAUDE A. LE ROY, *Primary Examiner.*

R. P. SEITTER, *Assistant Examiner.*